United States Patent
Tatsumi et al.

(10) Patent No.: US 8,173,092 B2
(45) Date of Patent: May 8, 2012

(54) REGULARLY ARRANGED NANOPARTICULATE SILICA AND PROCESS FOR PRODUCING THE SAME

(75) Inventors: Takashi Tatsumi, Kanagawa (JP); Toshiyuki Yokoi, Tokyo (JP)

(73) Assignee: Japan Science and Technology Agency, Saitama (JP)

( * ) Notice: Subject to any disclaimer, the term of this patent is extended or adjusted under 35 U.S.C. 154(b) by 910 days.

(21) Appl. No.: 11/886,216

(22) PCT Filed: Mar. 10, 2006

(86) PCT No.: PCT/JP2006/304696
§ 371 (c)(1),
(2), (4) Date: Aug. 11, 2008

(87) PCT Pub. No.: WO2006/095845
PCT Pub. Date: Sep. 14, 2006

(65) Prior Publication Data
US 2008/0311397 A1 Dec. 18, 2008

(30) Foreign Application Priority Data
Mar. 10, 2005 (JP) .................................. 2005-067665

(51) Int. Cl.
*C01B 33/021* (2006.01)
*C01B 33/12* (2006.01)
(52) U.S. Cl. ......... 423/335; 977/775; 977/777; 977/832
(58) Field of Classification Search .................. 423/335; 977/775, 777, 832
See application file for complete search history.

(56) References Cited

U.S. PATENT DOCUMENTS
7,405,315 B2 * 7/2008 Tatsumi et al. ............... 556/413

FOREIGN PATENT DOCUMENTS
| JP | 2000-159509 | 6/2000 |
| JP | 2002-286962 | 10/2002 |
| WO | WO-2004/094311 | 4/2004 |

OTHER PUBLICATIONS
Che et al, A novel anionic surfactant templating route for synthesizing mesoporous silica with unique structure, Nature Materials, vol. 2, Dec. 2003, 801-805.*

(Continued)

*Primary Examiner* — Hoa (Holly) Le
(74) *Attorney, Agent, or Firm* — Peter F. Corless; Christine C. O'Day; Edwards Wildman Palmer LLP

(57) ABSTRACT

A novel silica which is in the form of ultrafine particles having mesopores and has a regular structure; and a process for producing the silica. The silica is a self-organized nanoparticulate silica characterized in that the average particle diameter is 4 to 30 nm, preferably 6 to 20 nm, and these particles are regularly arranged so as to form a primitive cubic lattice. The self-organized nanoparticulate silica is produced by mixing an alkoxysilane with an aqueous solution of a basic amino acid, reacting the mixture at 40 to 100° C., and subjecting the reaction mixture to drying and preferably to subsequent burning. Also provided is a process for producing fine silica particles having a particle diameter of 4 to 30 nm, which comprises mixing a solution of an alkoxysilane compound having 1 to 4 alkoxy groups with a solution of a basic amino acid and reacting the mixture at 20 to 100° C. to cause hydrolysis and condensation polymerization.

5 Claims, 14 Drawing Sheets

OTHER PUBLICATIONS

Sakamoto et al, Direct imaging of the pores and cages of three-dimensional mesoporous materials, Nature, vol. 408, p. 449-453, Nov. 2000.*

L. Sudheendra et al., "Peptide-induced formation of silica from tetraethylorthosilicate at near-neutral pH", *Materials Research Bulletin 37*, pp. 151-159 (2002).

* cited by examiner (Figure 1)
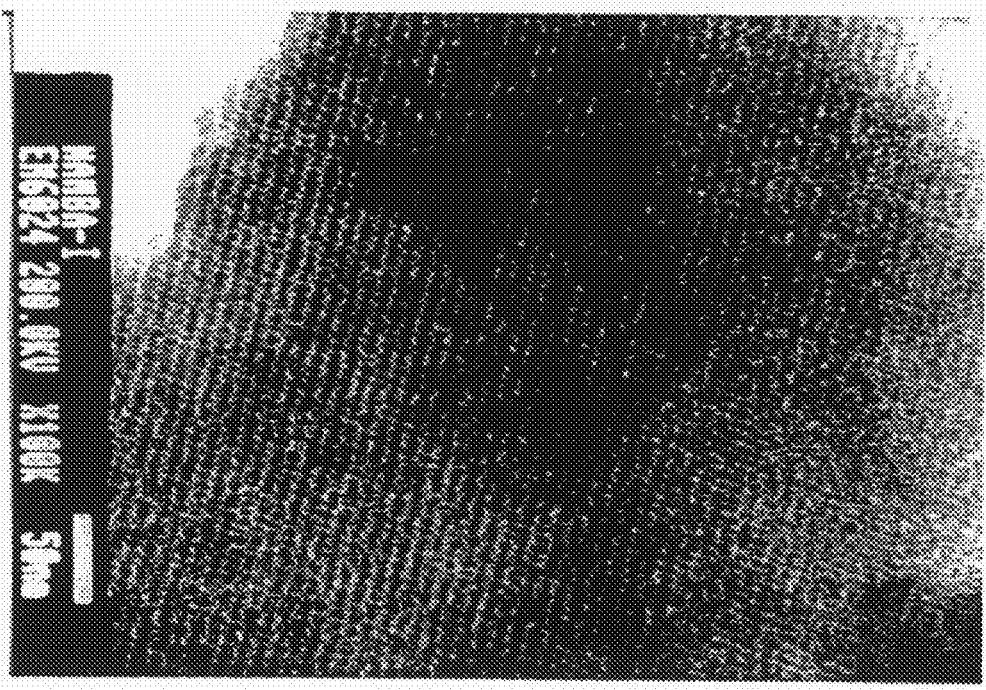
(Figure 2)
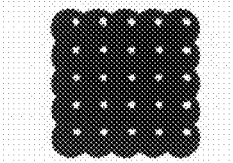
{100}
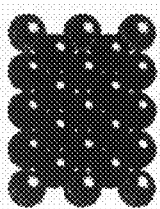
{110}
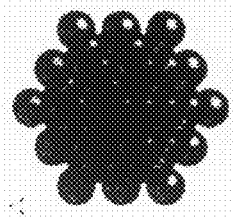
{111}

(Figure 3)
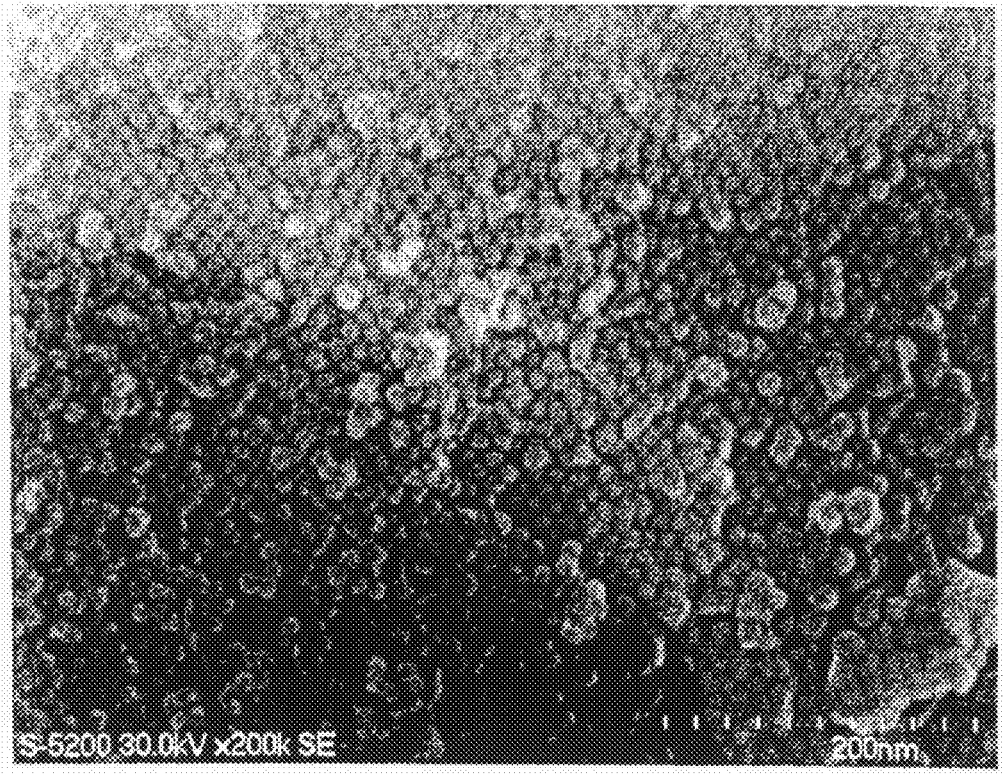
(Figure 4)
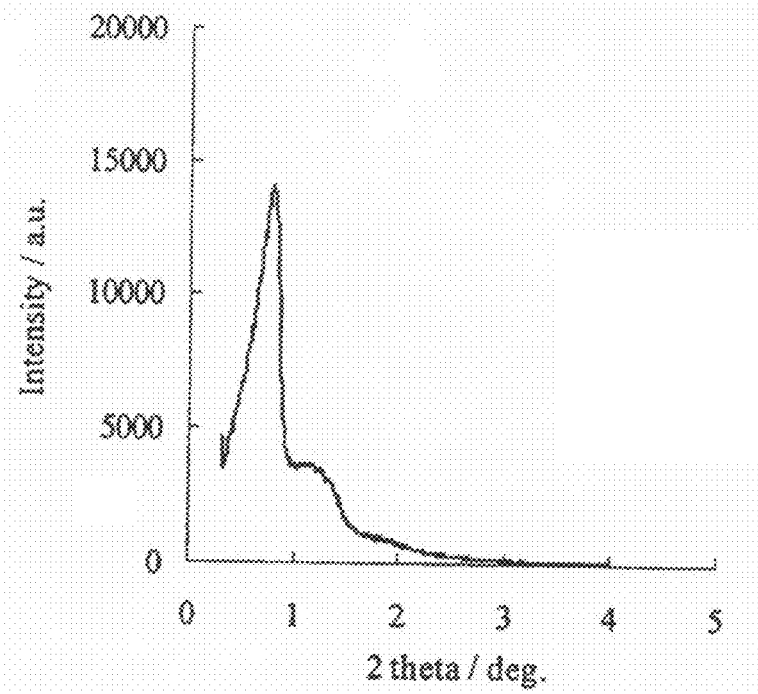

(Figure 5)
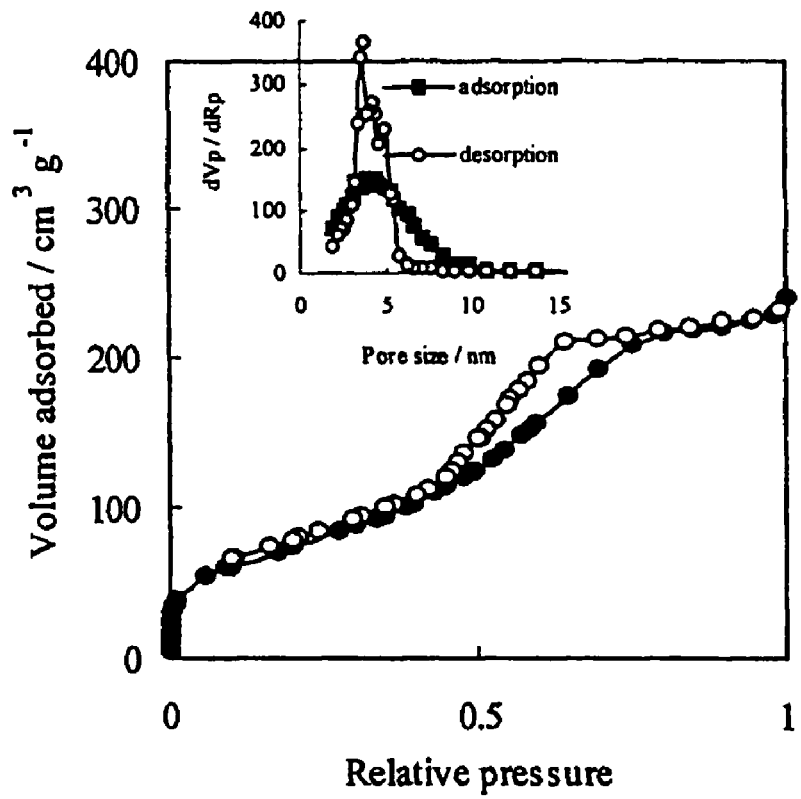
(Figure 6)
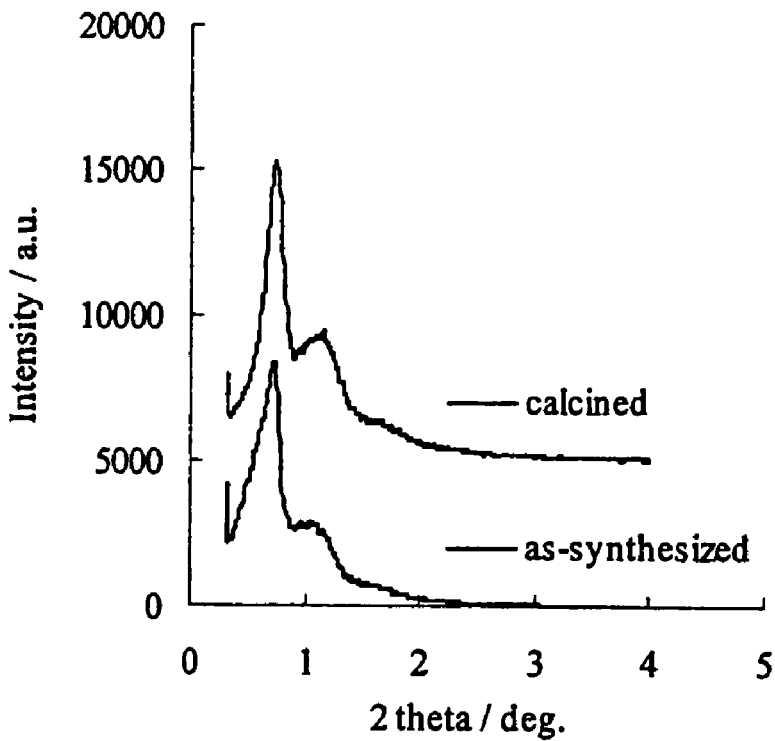

(Figure 7)
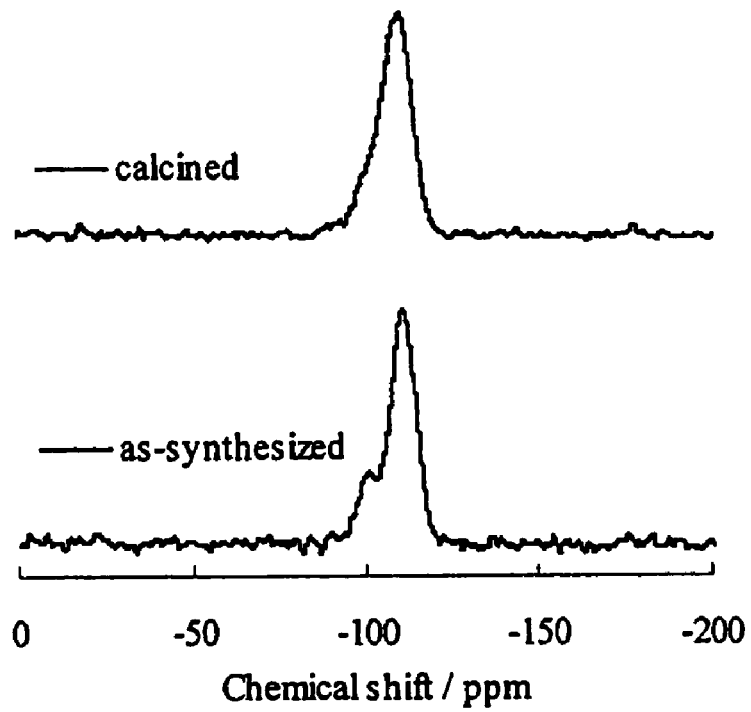
(Figure 8)
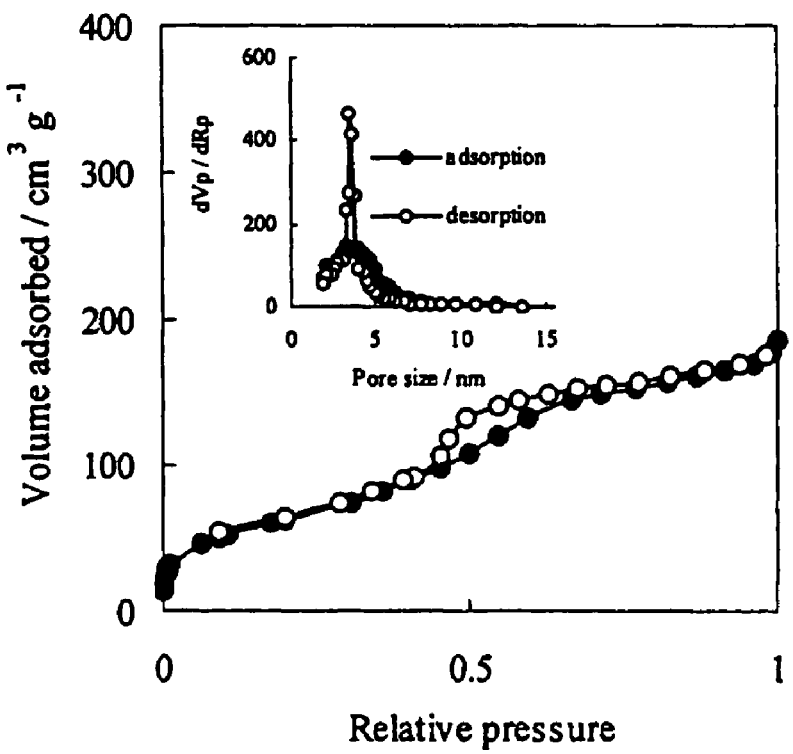

(Figure 9)
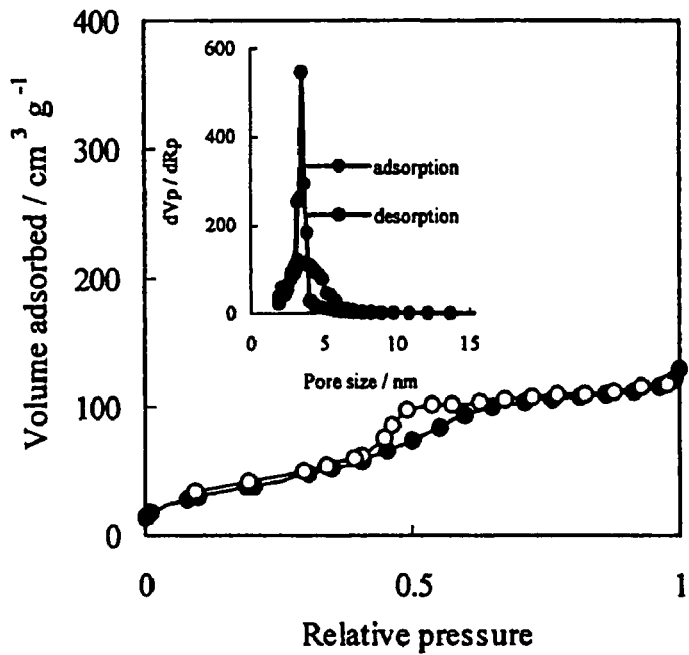
(Figure 10)
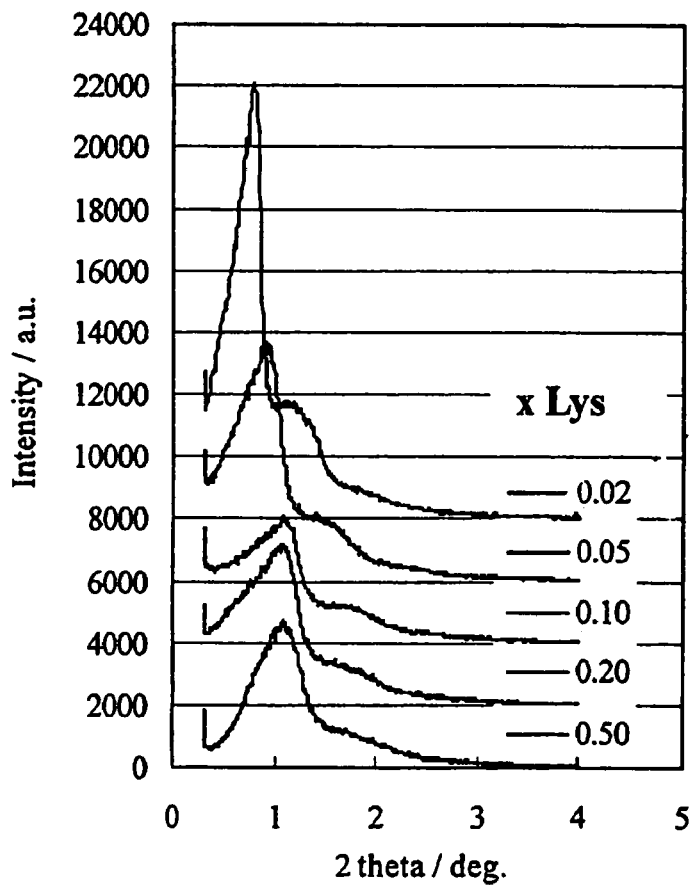

(Figure 11)
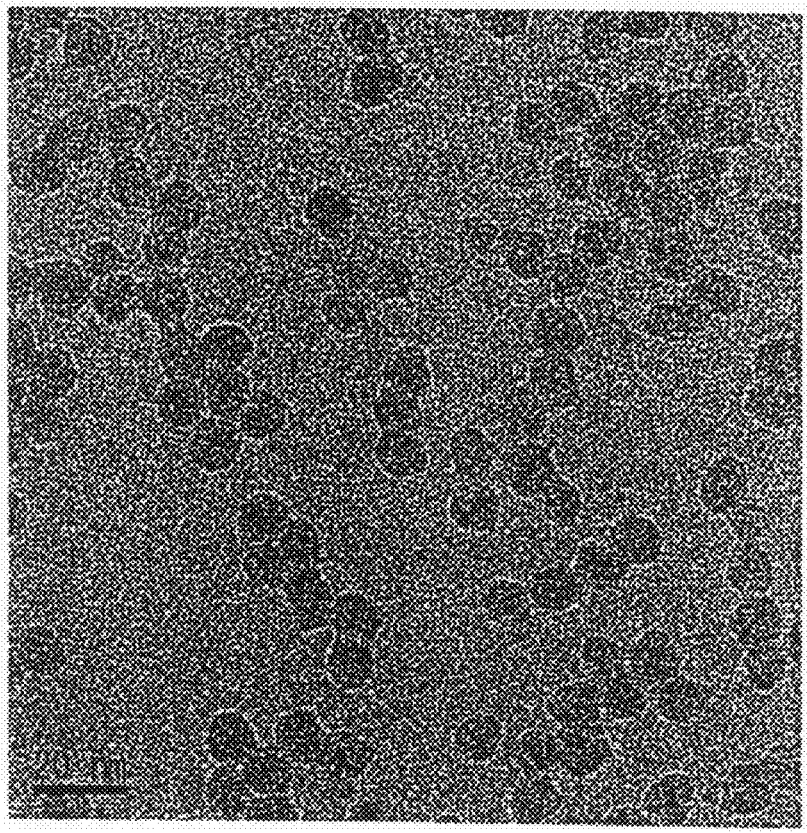
(Figure 12)
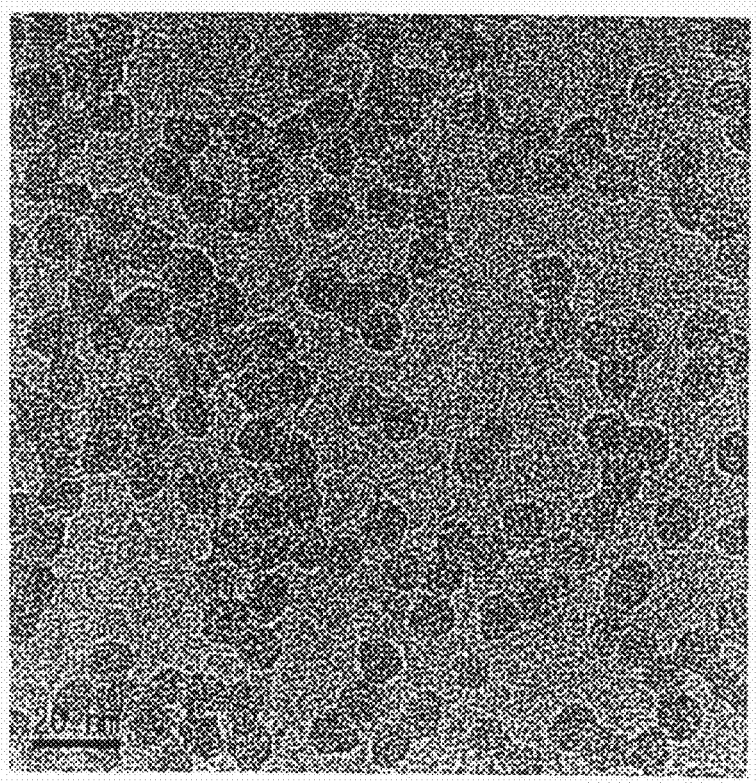

[Figure 13]
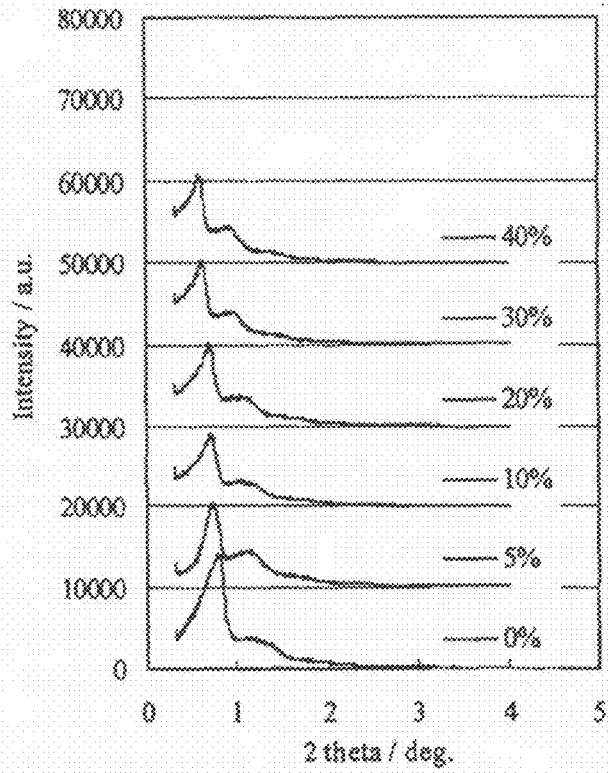
[Figure 14]
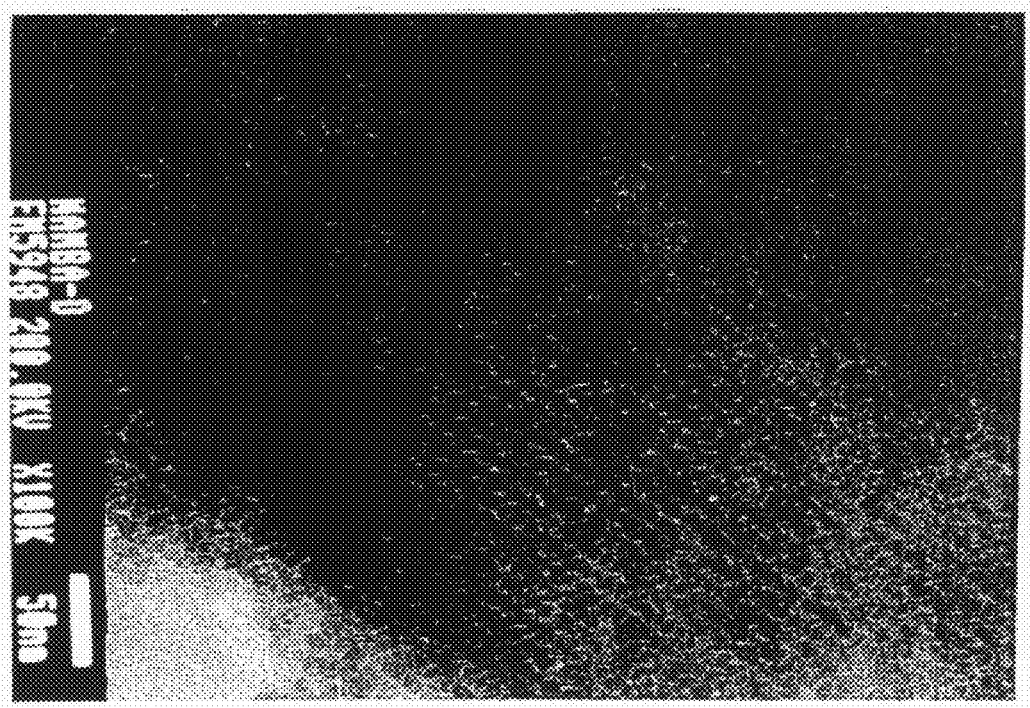

(Figure 15)
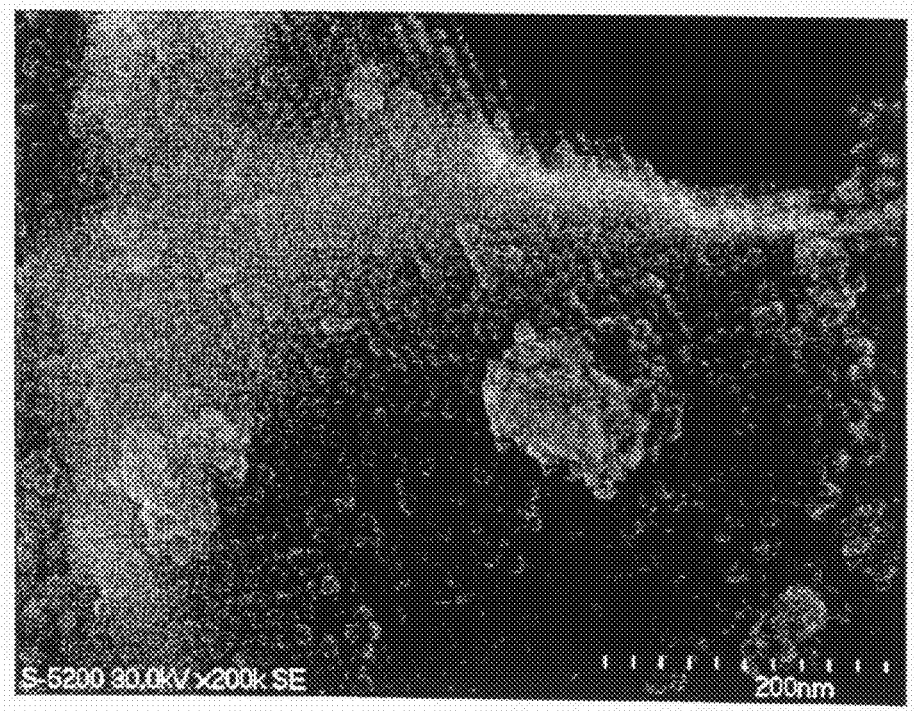
(Figure 16)
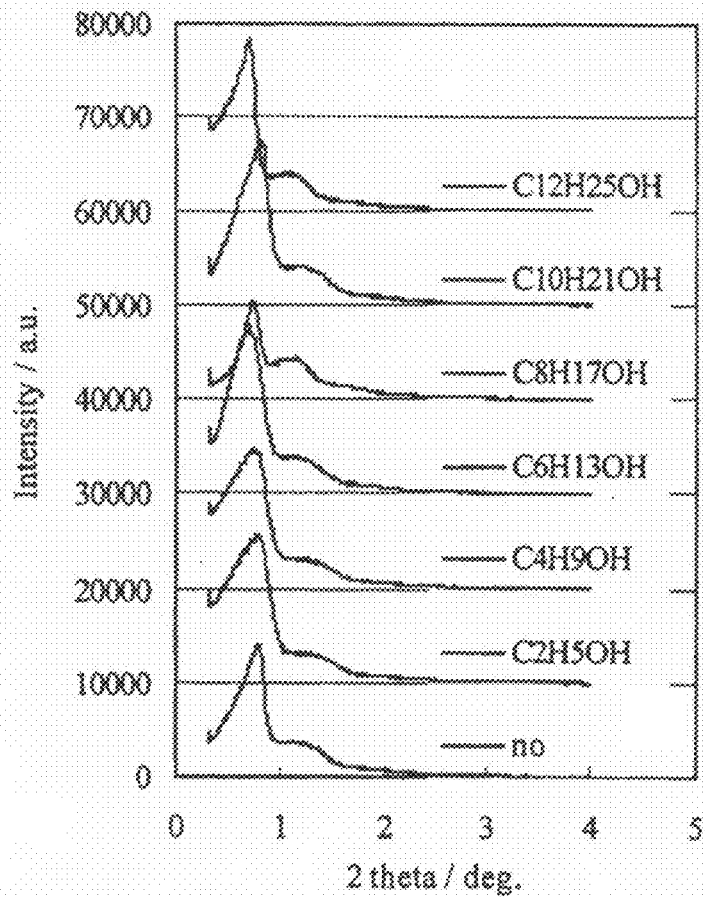

(Figure 17)
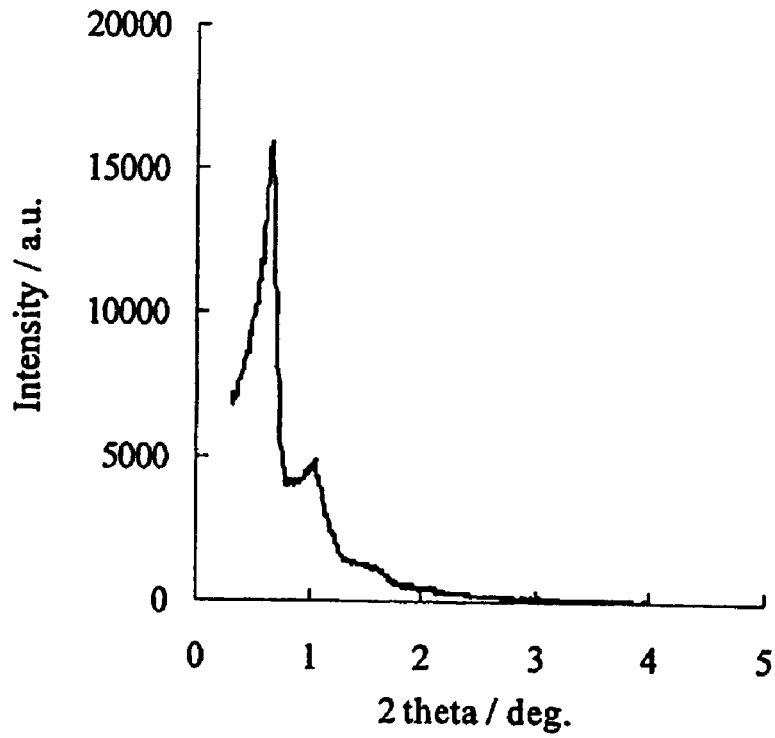
(Figure 18)
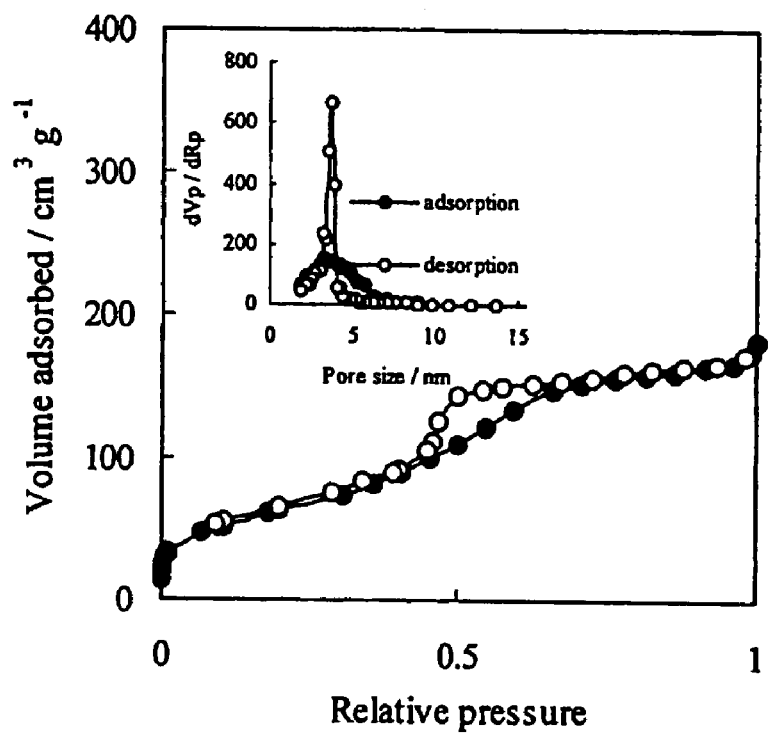

(Figure 19)
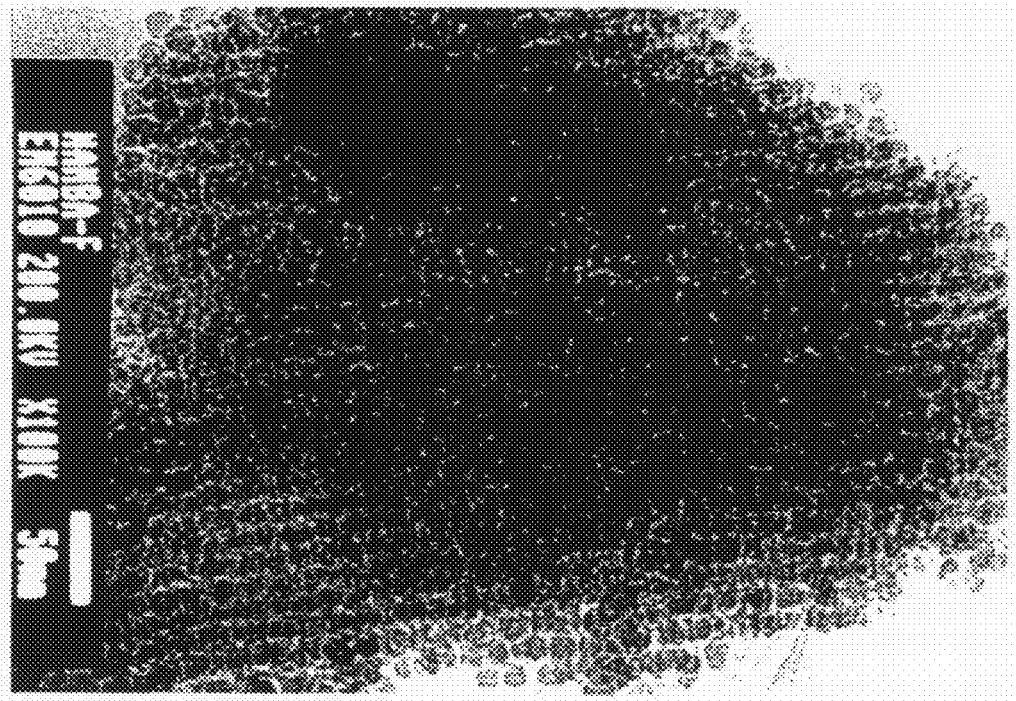
(Figure 20)
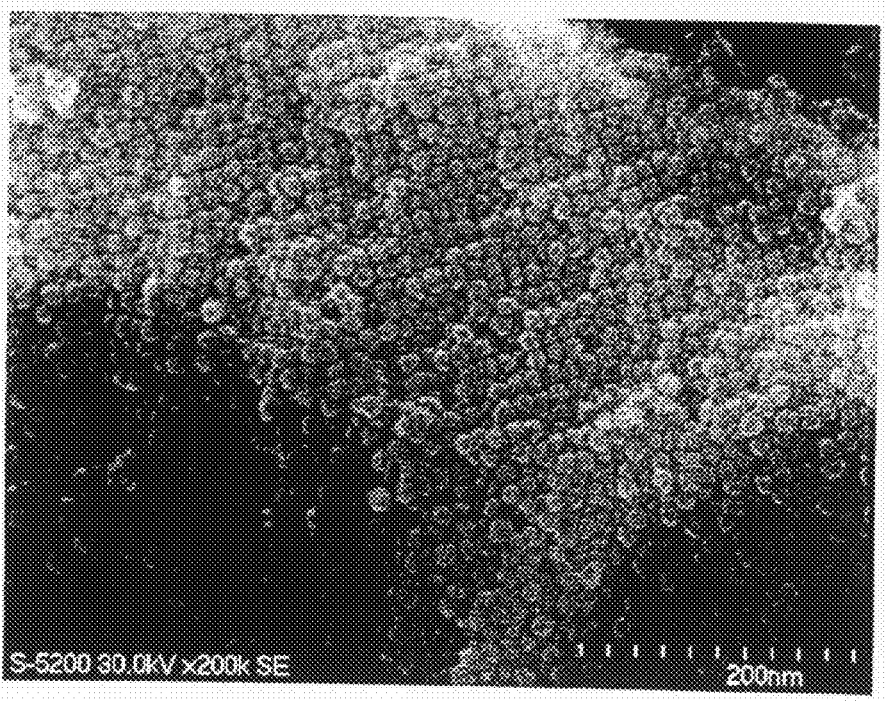

(Figure 21)
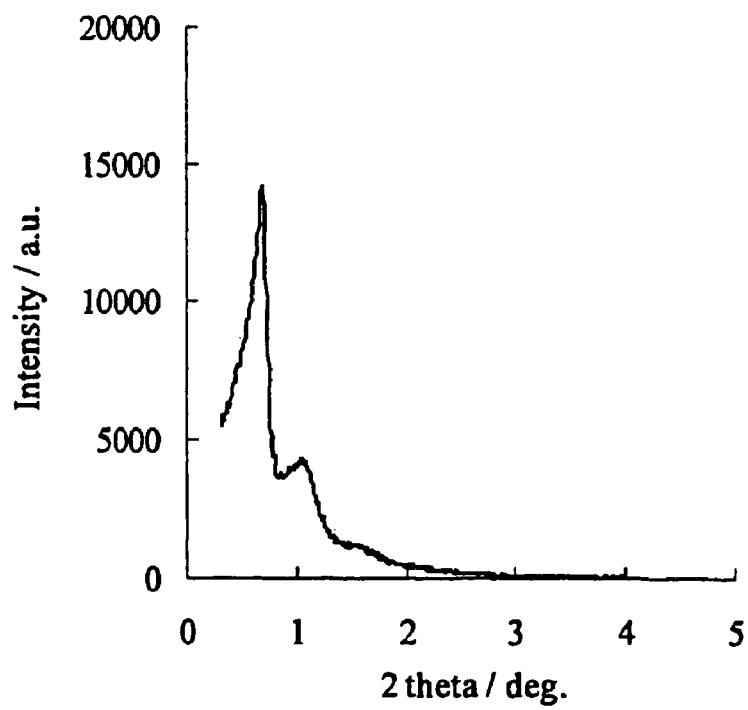
(Figure 22)
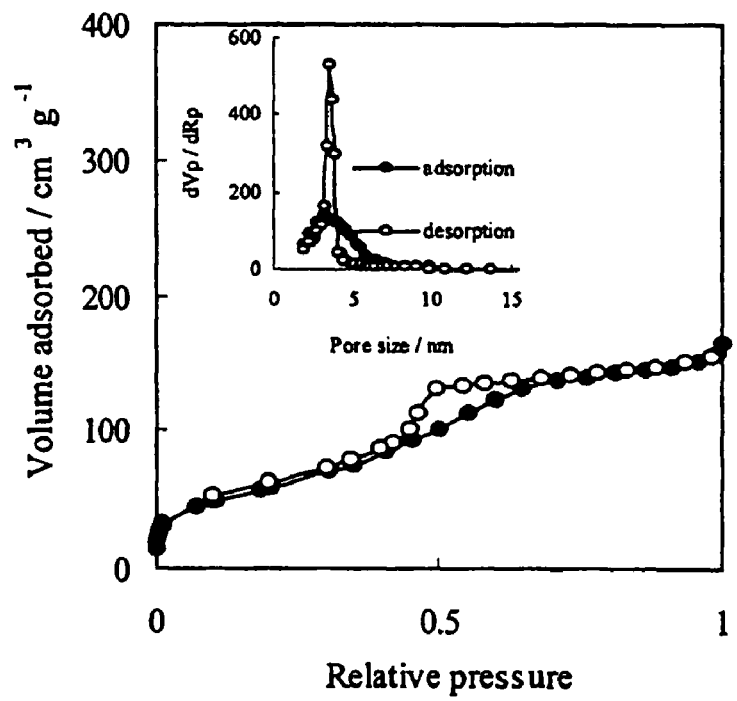

(Figure 23)
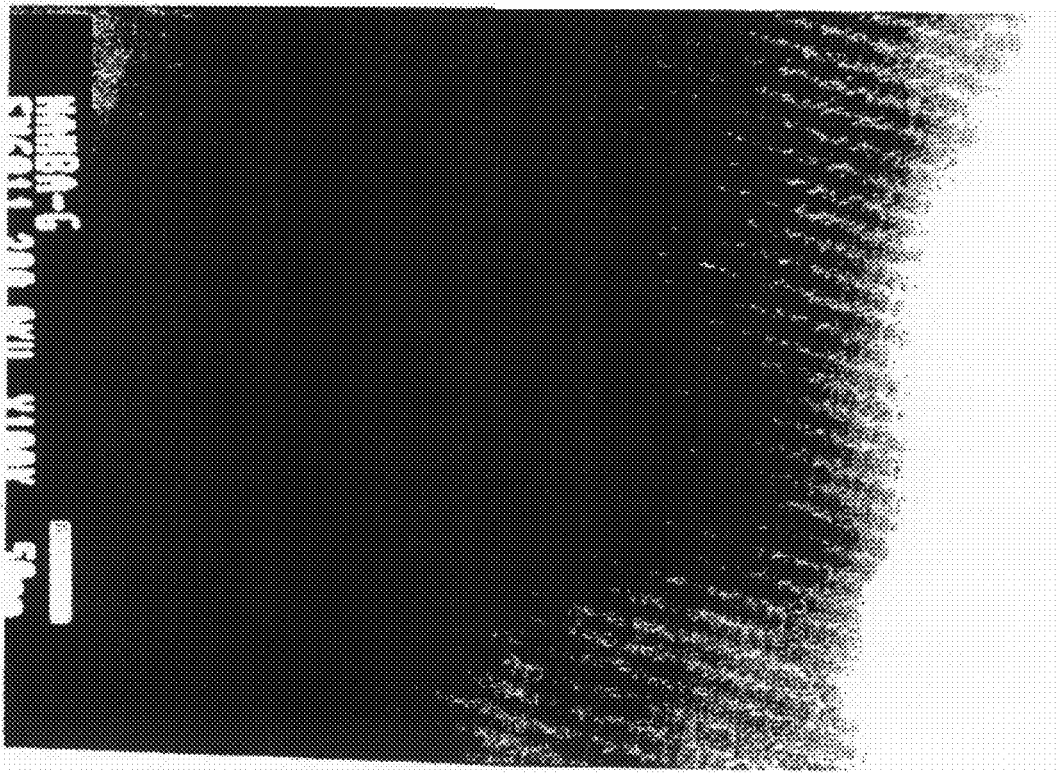
(Figure 24)
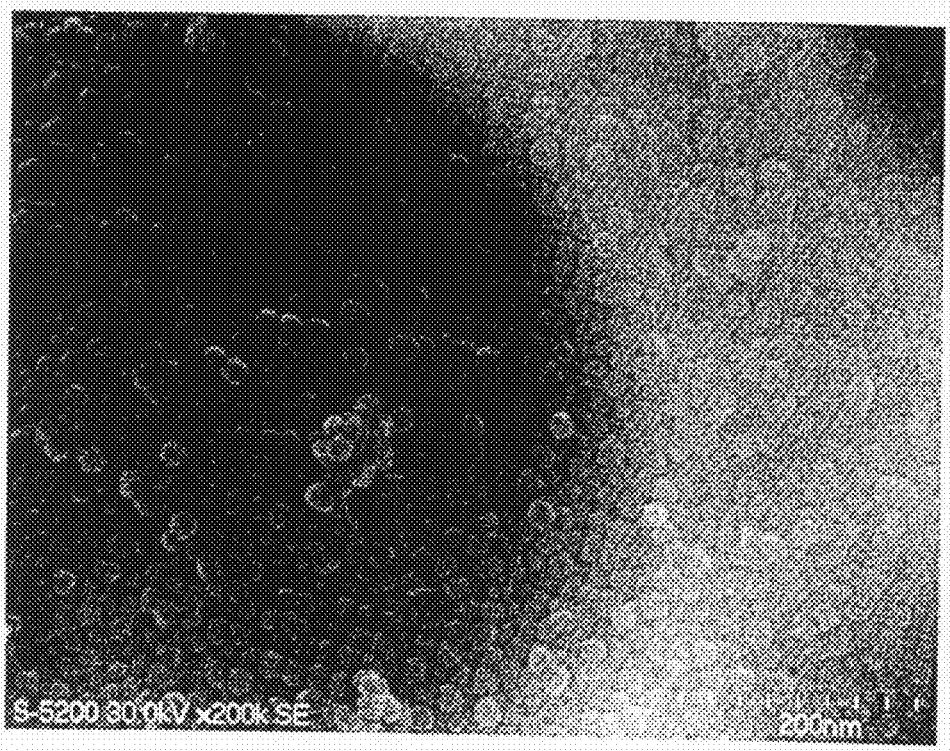

(Figure 25)
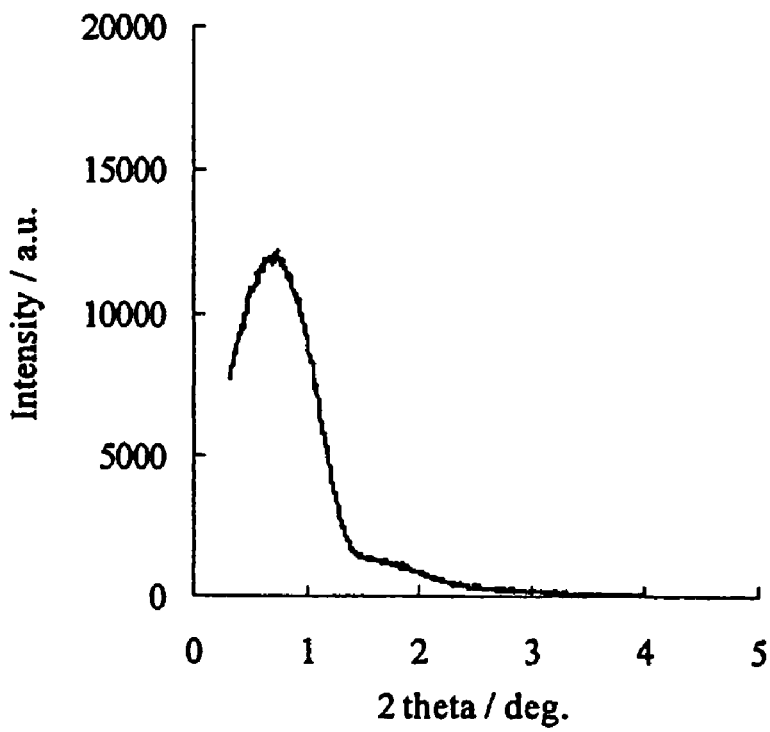
(Figure 26)
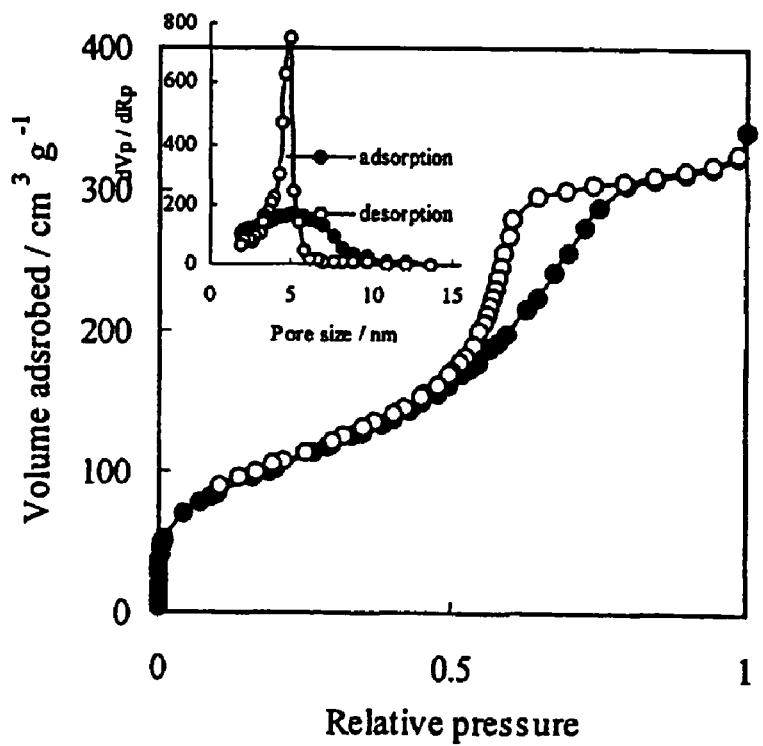

(Figure 27)
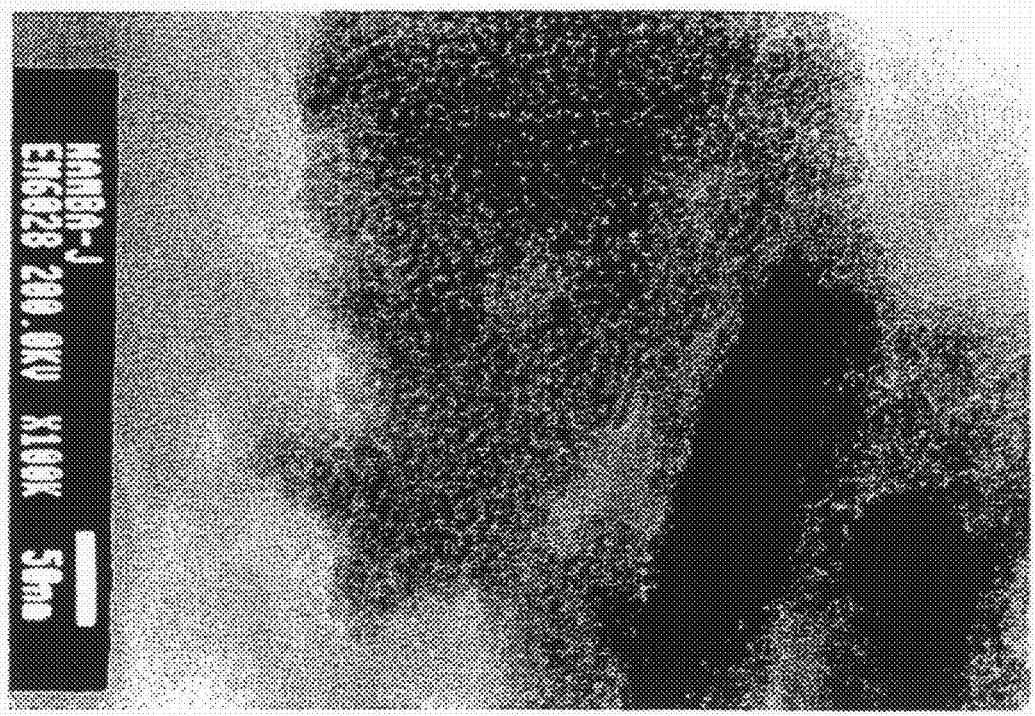
(Figure 28)
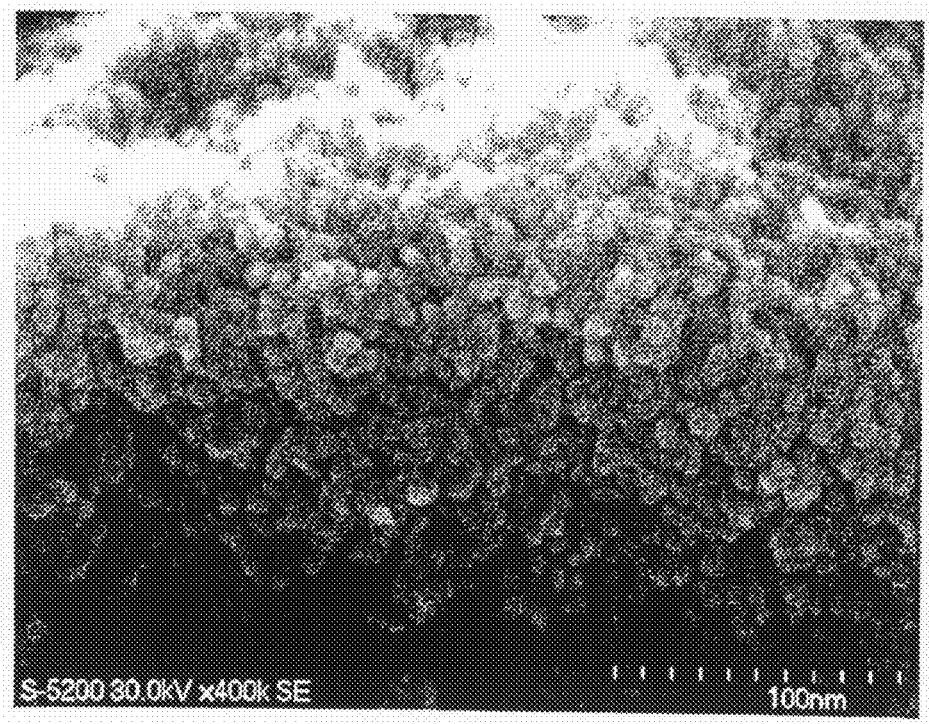

REGULARLY ARRANGED NANOPARTICULATE SILICA AND PROCESS FOR PRODUCING THE SAME

TECHNICAL FIELD

The present invention relates to a self-organized nanoparticulate silica characterized in that the average particle diameter thereof is 6 to 20 nm, preferably 8 to 15 nm and these particles are regularly arranged so as to form a primitive cubic lattice, and a process for producing the same. The self-organized nanoparticulate silica of the present invention is produced by mixing an alkoxysilane with an aqueous solution of a basic amino acid, reacting this mixture at 40 to 100° C. and then drying this mixture, and preferably further calcinating after drying. In addition, the present invention relates to a process for producing fine silica particles having a particle diameter of 4 to 30 nm, which comprises mixing a solution of an alkoxysilane compound having 1 to 4 alkoxy groups with a solution of a basic amino acid and subjecting the mixture to hydrolysis at a reaction temperature from 20 to 100° C. and to condensation polymerization.

BACKGROUND ART

Fine particles are classified into particles of a diameter larger than 100 nm and particles of a diameter smaller than 100 nm that are so-called ultrafine particles. The particles larger than 100 nm have been used from old times as constituent materials of cement, cosmetics, toner for electronic copying, and the like, whereas the particles smaller than 100 nm are used in materials field of ceramics, magnetic tape, super LSI element and the like. As the method for producing such ultrafine particles, a metal alkoxide hydrolysis method, a coprecipitation method, an inorganic salt hydrolysis method, a spray-drying method, a plasma method, a laser method and the like are known, and it is possible to obtain ultrafine particles of a nanometer order. For example, nano-sized fine silica particles smaller than 100 nm, which are known as a silica sol or a colloidal silica, are produced by a method of neutralizing sodium silicate with an acid or a method of hydrolyzing a tetraalkoxysilane followed by condensation polymerization (see nonpatent literatures 1 and 2). This colloidal silica is sphere-shaped, and is a spherical colloid dispersed in a polar solvent such as water and an alcohol, and is already dispersing uniformly in a solvent. In addition, a method of synthesizing a mesoporous silica having a nano-sized porous structure by hydrolyzing a tetraalkoxysilane in the presence of a cationic surfactant followed by condensation polymerization, is known (see nonpatent literature 3).

Although nanometer order ultrafine particles can be produced by such hydrolysis methods of an alkoxysilane, the particle diameter distribution of the obtained ultrafine particles is not uniform but usually broad. In addition, the shape of the particles is indeterminate form.

Consequently, a process for producing ultrafine silica particles having a uniform diameter, in which, using a dendrimer with silylated surface, the ultrafine silica particles are produced on the surface of a dendrimer, is proposed (see patent literature 1).

In addition, a method for improving heat resistance, mechanical characteristics, gas-barrier nature and the like of a resin, by inserting a quaternary ammonium salt or the like between the layers of a swelling phyllosilicate compound having a particle diameter of 0.1 to several ten μm and dispersing salt thereof in the resin, is studied (see patent literature 2). The development of a resin composite made of ultrafine particles having a further small particle diameter is demanded, and it is considered that, if nano-sized and plate-shaped fine silica particles could be produced, particles thereof can be used as a filler to be blended in various resins to improve the characteristics of the obtained composite material such as heat resistance, gas-barrier nature and a lower expansion coefficient while keeping dispersibility of the particles in the resins. Colloidal silica dispersed uniformly in a solvent already, therefore, is compounded with a resin by a seed polymerization method and the like while keeping the dispersion state (see patent literature 3). The composite material produced by such a method, however, has not satisfactory characteristics. In addition, for this reason, a solid powder of fine silica particles to be obtained by hydrolyzing a tetrafunctional hydrolyzable silane compound in water in the presence of a cation surfactant followed by condensation polymerization and discontinuing the reaction using a monofunctional hydrolyzable organosilane compound halfway in the reaction, has been developed (see patent literature 4). The above fine particles are a powder of plate-shaped fine silica particles that contains 10% or less of a component having a molecular weight of 1 million or more based on the area ratio of the differential molecular weight distribution curve measured in polystyrene equivalent by gel permeation chromatography and has a number-average molecular weight of 1,500 to 100,000 obtained in the above measurement, a maximum length less than 200 nm, an average length of 1 to 50 nm and at least a triorganosilyl group on the surface and these particles have film-forming nature and can form a thin film.

According to spread of a portable electronic device represented by a cellular phone and a laptop PC, a thin secondary battery having a high energy density is under development. A mesoporous silica having a structure where mesopores of a uniform diameter are arranged draws attention as an inorganic solid electrolyte for such a secondary battery. Such a mesoporous silica having a regular pore structure is known to show various macroscopic morphology, and can be subjected to diverse morphological control, and is expected to be applied for a functional material such as an optical material and an electronic material besides a conventional application such as a catalyst and an adsorbent. For example, a model of an ion channel is proposed, which is constructed by an aggregate of a surfactant formed in the pores of a mesoporous silica using the mesoporous silica, alkylpolyethylene oxide as the surfactant and lithium trifluorometane sulfonate as an electrolyte, and a lithium ion of the electrolyte transfers via the polyethylene oxide part of the aggregate. A new type of ion-conductive solid electrolyte free from faults of a conventional secondary battery has been developed by using such a mesoporous silica. For example, an ion-conductive solid electrolyte is proposed, which is produced by hydrolyzing a silicon compound in the presence of a substance having ion conductivity in the molecule such as a nonionic surfactant to form a mesoporous silica having a lamellar structure and then treating the obtained mesoporous silica in a magnetic field to provide orientation to the mesostructure in the electrolyte (see patent literature 5).

Such ultrafine silica particles having mesopores and a regular structure is greatly expected as a material for improving resin characteristics and a solid electrolyte for a secondary battery, besides as a conventional application such as a catalyst and an adsorbent. Development of an ultrafine silica as a nanotechnology material has drawn attention.

Patent Literature 1: JP-A-2003-2632
Patent Literature 2: JP-A-11-92677

Patent Literature 3: JP-A-9-194208
Patent Literature 4: JP-A-2005-2146
Patent Literature 5: JP-A-2002-42550
Nonpatent Literature 1: Ultrafine Particles—Science and Application—Edited by The Chemical Society of Japan, Kagaku Sousetu No. 48, Gakkai Shuppan Center (1985)
Nonpatent Literature 2: Simodaira, Ishijima: Bulletin of the Chemical Society of Japan, 1503-1505 (1981)
Nonpatent Literature 3: Langmuir Vol. 16, 2376 (2000)

DISCLOSURE OF INVENTION

Problem to be Solved by the Invention

The present invention provides new ultrafine silica particles having mesopores and a regular structure and a process for producing the same. In addition, the present invention provides ultrafine silica particles, preferably dispersions of ultrafine silica particles.

Means for Solving the Problem

A process of hydrolyzing an alkoxysilane such as tetraethoxysilane (TEOS) is conventionally known as a process for producing ultrafine silica particles and many trial-and-error methods have been carried out on hydrolysis conditions and condensation polymerization conditions. After having studied on synthesis of the silica having a new structure under various conditions, the present inventors have found that ultrafine silica particles having an extremely unique three-dimensional structure can be obtained by hydrolyzing an alkoxysilane in the presence of a basic amino acid followed by condensation polymerization.

In other words, the present invention relates to a self-organized nanoparticulate silica characterized in that the average particle diameter thereof is 4 to 15 nm, preferably 4 to 10 nm and these particles are regularly arranged so as to form a primitive cubic lattice.

In addition, the present invention relates to a process for producing a self-organized nanoparticulate silica characterized in that the average particle diameter thereof is 4 to 15 nm and these particles are regularly arranged so as to form a primitive cubic lattice, which comprises mixing an alkoxysilane with an aqueous solution of a basic amino acid, reacting the mixture at 40 to 100° C. and then subjecting the reaction mixture to drying.

Further, the present invention relates to a process for producing fine silica particles having a particle diameter of 4 to 30 nm, which comprises mixing a solution of an alkoxysilane compound having 1 to 4 alkoxy groups with a solution of a basic amino acid and subjecting the mixture to hydrolysis at a reaction temperature from 20 to 100° C. and to condensation polymerization.

FIG. 1 is a photograph substituting for a drawing showing the result of an example of the self-organized nanoparticulate silica of the present invention observed through a transmission electron microscope (TEM). A white bar on the left shows a length of 50 nm. The black dots show silica nanoparticles in this FIG. 1, and it can be seen that the silica particles are extremely regularly arranged in the self-organized nanoparticulate silica of the present invention. In addition, more particularly, it can be seen that the silica particles are located on the same line both horizontally and vertically, in other words, each particle is not located alternately, but four adjacent particles are located each at a position of each corner of a nearly square. This is an extremely unique structure. Silica particles are not located so as to fill densely a space but are located each at apposition of each corner of a quadrangle on the plan view, and a wide opening (void) is formed at the center part of the quadrangle. FIG. 2 is pattern drawings viewed from each direction showing an arrangement of silica particles in the self-organized nanoparticulate silica of the present invention. Black dots in FIG. 2 (blue dots in the original drawing) show silica particles, which are ultrafine particles having a particle diameter of about 4 to 15 nm. Silica particles shown in FIG. 1 had a particle diameter of about 8.3 to 9.5 nm. When silica particles are present more densely, the silica particles in the middle layer are located between the particles in the upper layer, deviated from the particles in the upper layer by a length of about the radius of the particles in the upper layer, however, the self-organized nanoparticulate silica of the present invention is characterized in that the silica particles are not so dense as the above and silica particles and silica particles adjacent to the particle lengthwise/crosswise and up/down have their centers on the same axis. And as seen in a transmission electronic microscope photograph, such regular structure reaches the deep part of the whole particle. The self-organized nanoparticulate silica of the present invention, therefore, has a relatively large void and forms mesopores.

FIG. 3 is a photograph substituting for a drawing showing the result of an example of the self-organized nanoparticulate silica of the present invention observed through a scanning electron microscope (SEM). The scale at the right bottom of the photograph shows a length of 20 nm by one scale and a length of 200 nm by the whole scale. It can be seen that silica particles are arranged regularly and orderly on the surface too.

The above self-organized nanoparticulate silica of the present invention shown in FIG. 1 and FIG. 3 was produced by using tetraethoxysilane (TEOS) as an alkoxysilane and a 1% by mass of aqueous solution of lysine as a basic amino acid. The result of X-ray diffraction (XRD) thereof is shown in FIG. 4. The axis of ordinate shows intensity (a.u.) and the axis of abscissa shows 2θ/degree in FIG. 4. The self-organized nanoparticulate silica of the present invention shows an extremely sharp peak in XRD, which shows that the particles are extremely regularly arranged. The d-value calculated from this XRD pattern was 10.8 nm, 7.5 nm and 5.0 nm. In addition, the measured result of nitrogen adsorption/desorption (isotherm) curve of the self-organized nanoparticulate silica is shown in FIG. 5. The axis of ordinate shows adsorbed or desorbed volume ($cm^3/g$) and the axis of abscissa shows relative pressure in FIG. 5. Black spheres (●) show adsorption, white spheres (○) show desorption. The upper graph in FIG. 5 shows the pore size from this result. The results showed that the specific surface area is 269 $m^2/g$ and the average pore size is 3.6 nm.

The first characteristic of the nanoparticulate silica of the present invention is that the silica particles are composed of ultrafine particles having an average particle diameter of 4 to 30 nm, preferably 4 to 15 nm, 4 to 10 nm, 6 to 20 nm or 8 to 15 nm. The second characteristic is that these silica particles are regularly arranged so as to form a primitive cubic lattice. Further, the third characteristic is that the silica particles are self-organized to form a nanoparticulate silica.

Further, the self-organized nanoparticulate silica of the present invention is characterized by having a specific surface area obtained by nitrogen adsorption/desorption measurement of 200 to 350 $m^2/g$, preferably 200-350 $m^2/g$ having a specific surface area after calcination and more preferably 200-300 $m^2/g$ and further characterized by having mesopores, wherein the average pore size is preferably 3 to 5 nm and more preferably 3 to 4 nm.

And, the self-organized nanoparticulate silica of the present invention is for the first time produced by hydrolyzing an alkoxysilane in the presence of a basic amino acid and is characterized by being produced by such method.

In addition, the present invention provides a process for producing fine silica particles composed of a silica compound having a particle diameter of 4 to 30 nm. The fine silica particles of the present invention have a particle diameter of a nanoorder and preferably are dispersed in a solvent. Such a dispersing medium is preferably water or a solvent obtained by adding organic auxiliaries to be described later to water, but is not limited thereto. An alcohol-based solvent such as methanol and ethanol, a ketone-based solvent such as acetone and cyclohexanone, an ether-based solvent such as THF, an aromatic hydrocarbon-based solvent such as benzene and xylene, and the like, are used as the dispersing medium by a method such as solvent exchange.

The self-organized nanoparticulate silica of the present invention can be produced by mixing an alkoxysilane with an aqueous solution of a basic amino acid, reacting the mixture at 20 to 100° C., preferably at 40 to 100° C. and then subjecting the reaction mixture to drying and preferably subsequent calcination.

In addition, the fine silane particles of the present invention can be produced by mixing an alkoxysilane with an aqueous solution of a basic amino acid and reacting the mixture at 20 to 100° C., preferably at 40 to 100° C. In more detail, the fine silane particles of the present invention can be produced by mixing a solution of an alkoxysilane compound having 1 to 4 alkoxy groups with a solution of a basic amino acid, subjecting the mixture to hydrolysis at a reaction temperature from 20 to 100° C. and to condensation polymerization, and depositing a silica compound having a particle diameter of 4 to 30 nm. The self-organized nanoparticulate silica of the present invention can be produced by drying the fine silane particles produced in this way until the solvent evaporates to dryness, and preferably calcination after drying.

The alkoxysilane to be used in the process of the present invention is not limited, as long as it can be hydrolyzed by an aqueous solution of a basic amino acid to form a silica. Preferable alkoxysilane includes one containing an alkoxy group composed of a straight chain or branch chain alkyl group having 1 to 15, preferably 1 to 10 and more preferably 1 to 6 carbon atoms. Four alkoxy groups of the alkoxysilane may be different from each other or the same, but preferably a tetraalkoxysilane, which four alkoxy groups are same, is included. The preferable alkoxy group includes a methoxy group, an ethoxy group, an n-propoxy group and the like but is not limited thereto. The preferable alkoxysilane includes tetramethoxysilane, tetraethoxysilane (TEOS) and the like.

In addition, the alkoxysilane compound having 1 to 4 alkoxy groups includes a silane compound where 1 to 4 alkoxy groups composed of a straight chain or branch chain alkyl group having 1 to 15, preferably 1 to 10 and more preferably 1 to 6 carbon atoms bind to a silicon atom, and an alkoxysilane compound represented by the following general formula:

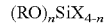

(RO)$_n$SiX$_{4-n}$ (wherein, X indicates a hydrogen atom, a hydroxyl group or an alkyl group of 1 to 5 carbon atoms; R indicates an alkyl group of 1 to 15 carbon atoms; and n indicates an integer of 1 to 4).

The solution of the alkoxysilane compound having 1 to 4 alkoxy groups is preferably an aqueous solution of the above alkoxysilane compound, but is not limited thereto, and includes an alcohol solution such as methanol and ethanol, an acetone solution, a mixed solution of these solvents, or the like.

The basic amino acid to be used in the process of the present invention may be either a natural amino acid or a nonnatural amino acid, and an amino acid having an amino group, a carboxyl group and a basic substituent such as an amino group, a substituted amino group and an imino group in the molecule. Preferable basic amino acid includes an α-amino acid substituted with 1 or 2, preferably 1 saturated or unsaturated aliphatic hydrocarbon group of 1 to 10, preferably 3 to 6 carbon atoms that is straight chain or branch chain and has 1 or 2 or more basic substituents such as an amino group, a substituted amino group and an imino group, on its α-position. Here, the basic substituent includes, for example, an amino group; a monoalkylamino group such as a methylamino group and an ethylamino group; a dialkylamino group such as a dimethylamino group and a diethylamino group; and an imino group such as an amidino group and a guanidino group. The alkyl group as the substituent includes a straight chain or branch chain aliphatic hydrocarbon of 1 to 10, preferably 1 to 6 carbon atoms, preferably an alkyl group of 1 to 10, preferably 1 to 6 carbon atoms, and preferably a methyl group, an ethyl group, an n-propyl group, an n-butyl group, an n-pentyl group, an n-hexyl group, an isopropyl group, an isobutyl group, a sec-butyl group, a cyclopentyl group and a cyclohexyl group. The basic substituent may include a cyclic amino group such as a pyrrolidinyl group, a piperidinyl group, a morpholino group, a piperazinyl group, a homopiperazinyl group, a pyridyl group and an imidazolyl group; and an imino group, but preferably a chained group. The saturated or unsaturated aliphatic hydrocarbon group of 1 to 10, preferably 3 to 6 carbon atoms that is straight chain or branch chain includes an alkyl group, an alkenyl group, but preferably a straight chain alkyl group such as a methyl group, an ethyl group, an n-propyl group, an n-butyl group, an n-pentyl group and an n-hexyl group and more preferably an n-propyl group and an n-butyl group. Preferable example of the basic amino acid includes an amino acid substituted with an ethyl group, an n-propyl group, an n-butyl group and the like having an amino group or a guanidino group, on the α-position of an α-amino acid, for example, lysine and arginine. Such a basic amino acid may be either an optically active compound or a racemic compound, but preferably an commercially available optically active basic amino acid in view of availability.

The aqueous solution of a basic amino acid in the process of the present invention can be used in a broad concentration range of 0.1 to 20% by mass, preferably 0.5 to 10% by mass of the basic amino acid. The ratio of a basic amino acid to be used relative to an alkoxysilane is 0.01 to 1.0, preferably 0.015 to 0.5 per 1 mol of the alkoxysilane, but is not limited thereto.

The aqueous solution of a basic amino acid in the process of the present invention can be used as it is, after the basic amino acid is dissolved. When a basic amino acid to be used is not soluble enough in water, a volatile organic solvent, for example, alcohols such as methanol and ethanol and ketones such as acetone can be added to dissolve the basic amino acid. In addition, a volatile acid such as hydrochloric acid and nitric acid can be used to adjust the pH of an aqueous solution of a basic amino acid. The preferable pH of the aqueous solution of a basic amino acid is a pH of 8 to 11, preferably a pH of 8 to 10 and more preferably 9 to 10, but is not limited thereto.

The solution of a basic amino acid of the present invention includes an alcohol solution such as methanol and ethanol, an acetone solution or a solution comprising of these mixed solvents besides the above aqueous solution.

Further, the organic auxiliaries can be added to the mixture of the alkoxysilane and the aqueous solution of a basic amino acid in the process of the present invention. The organic auxiliaries to be used here include a straight chain or branch chain, saturated or unsaturated aliphatic hydrocarbon of 6 to 20, preferably 6 to 15 carbon atoms; a straight chain or branch chain, saturated or unsaturated aliphatic alcohol of 4 to 20, preferably 4 to 15 carbon atoms; and a monocyclic, polycyclic or condensed cyclic aromatic hydrocarbon of 6 to 20, preferably 6 to 14 carbon atoms that may have a substituent. The aliphatic hydrocarbon preferably includes straight chain and saturated aliphatic hydrocarbons, that is, alkanes. The aliphatic alcohol preferably includes straight chain and saturated aliphatic alcohols, that is, alkanols. The aromatic hydrocarbon preferably includes benzene or its derivatives. The substitute in the aromatic hydrocarbon includes a straight chain or branch chain alkyl group of 1 to 6, preferably 1 to 4 carbon atoms, a halogen atom such as chlorine and bromine, and the like. Preferable organic auxiliaries include alkanes such as heptane, octane and decane; alcohols such as hexanol, octanol and decanol; and alkylbenzenes such as 1,3,5-trimethylbenzene (TMB) and 1,3,5-triethylbenzene, but are not limited thereto.

The amount of these organic auxiliaries to be used is not particularly limited, but is 0.1 to 2.0 mol, preferably 0.5 to 1.5 mol per 1 mol of an alkoxysilane.

Similarly to the above, the above organic auxiliaries can also be added to the mixture of the present invention comprising of a solution of an alkoxysilane compound having 1-4 alkoxy groups and a solution of a basic amino acid.

In the production process of the present invention, the mixture of an alkoxysilane and an aqueous solution of a basic amino acid, or the mixture obtained by adding the above organic auxiliaries to this mixture as needed, is subjected to reaction at 20 to 100° C., preferably 40 to 100° C. and more preferably 50 to 100° C. The reaction time is 10 to 80 hours, preferably about 20 to 80 hours, but usually about 30 to 50 hours. The reaction can be carried out by just leaving the mixture for standing, but preferably is carried out under stirring well with a propeller or a stirrer for the first 10 to 20 hours at a relatively low temperature, for example, 40 to 80° C., preferably about 50 to 60° C. in order to keep the mixture uniform. Preferably, the reaction mixture is left for standing at a high temperature, for example, 70 to 100° C., preferably 80 to 100° C. for 5 hours or more, preferably 10 hours or more in order to promote regular arrangement of silica particles.

The mixture of the present invention comprising of a solution of an alkoxysilane compound having 1 to 4 alkoxy groups and a solution of a basic amino acid, or the mixture obtained by adding the above organic auxiliaries to this mixture as needed, can be subjected to reaction under the similar reaction conditions. Under such reaction conditions, the raw material alkoxysilane compound having 1 to 4 alkoxy groups can be hydrolyzed followed by condensation polymerization to form fine silica particles of the present invention having a particle diameter of 4 to 30 nm in the reaction system.

Further, the self-organized nanoparticulate silica of the present invention can be produced by evaporating the reaction mixture to dryness under atmospheric pressure at 90 to 120° C., preferably 100° C. at the termination of the reaction. The self-organized nanoparticulate silica of the present invention can be used in a dried state by evaporating to dryness, but preferably is calcined at a high temperature for removing organic substances remaining in the reaction mixture. Calcination, however, is not necessarily a required step.

For example, FIGS. 6-9 show the results of XRD (FIG. 6), $^{29}$Si-MAS-NMR (FIG. 7) and nitrogen adsorption/desorption curves (FIGS. 8 and 9) of the calcined and as-synthesized self-organized nanoparticulate silica of the present invention produced by hydrolyzing tetraethoxysilane (TEOS) with an aqueous solution of lysine containing 5% by mass octanol. In FIG. 6 showing the result of XRD, the upper curve is for calcined, and the lower curve is for as-synthesized, that is, dried by evaporating to dryness. It can be seen that there is no basic difference between both curves, which show a sharp diffraction peak. In FIG. 7 showing the result of $^{29}$Si-MAS-NMR, the upper curve is for calcined, and the lower curve is for as-synthesized, that is, dried by evaporating to dryness. It can be seen that there is no basic difference between both curves and the peak of Si showing Si—OH at around δ-100 is only a little diminished by calcination. In FIGS. 8 and 9 showing the result of nitrogen adsorption/desorption curves, FIG. 8 is for calcined, and FIG. 9 is for as-synthesized, that is, dried by evaporating to dryness. There is no basic difference between both figures.

The self-organized nanoparticulate silica of the present invention thus does not show a particular difference in its spectral lines between calcined and as-synthesized, and a calcination step is not necessarily required. Preferably, calcination is carried out according to a common method for producing a silica.

Calcination can be carried out in the air and also in an atmosphere of an inert gas such as nitrogen gas and argon gas. The calcination temperature is similar to that in a common method for producing a silica, for example, 450 to 700° C., preferably 500 to 600° C.

The detail reason why ultrafine silica particles are extremely regularly arranged to form a structure having mesopores by using a basic amino acid, as is the case with the self-organized nanoparticulate silica of the present invention, is not necessarily clear. It is considered that a chain structure of the basic amino acid has some effect on self-organization of the silica particles, while the molecule of the basic amino acid serves as a basic catalyst in hydrolyzation of an alkoxysilane.

The self-organized nanoparticulate silica of the present invention has a structure in which ultrafine silica particles are extremely regularly arranged, and the structure exists not only on the surface of a particle, but also in the whole body of the particle. The whole particle is composed of regularly arranged ultrafine silica particles and has mesopores large enough to confine various organic substances therein. The self-organized nanoparticulate silica of the present invention is thus useful not only for various catalysts and adsorbents, but also for a silica thin film, a resin filler, a microelectronics material and a mold material for manufacturing various carbon nanotubes as a silica having a new structure.

Advantages of the Invention

The present invention provides a self-organized nanoparticulate silica composed of ultrafine silica particles having a novel structure, and a process for producing the same. The self-organized nanoparticulate silica of the present invention can be used for limitless applications as a new silica material, because it contains an extremely unique unit cell having a primitive cubic lattice and also has a large void fraction, mesopores and an extremely regular structure.

The production process of the present invention in which ultrafine silica particles are self-organized by hydrolysis without using a special template material to form a nanoparticulate silica, is an industrial process for producing a new silica material that enables simple production at a low cost.

In addition, the fine silica particles of the present invention of a particle diameter of 4 to 30 nm, which have a nanometer-sized and uniform diameter, are useful not only as a raw material for producing the self-organized nanoparticulate silica composed of ultrafine silica particles of the present invention, but also as a carrier at a molecular level such as a carrier of a pharmaceutical effective component.

BRIEF DESCRIPTION OF THE DRAWINGS (FIG. 1)
FIG. 1 is a photograph substituting for a drawing showing the result of an example of the self-organized nanoparticulate silica of the present invention observed through a transmission electron microscope (TEM). A white bar on the left shows a length of 50 nm.

(FIG. 2)
FIG. 2 is pattern drawings viewed from each direction showing an arrangement of silica particles in the self-organized nanoparticulate silica of the present invention. Black dots in FIG. 2 (blue dots in the original drawing) show silica particles. In FIG. 2, the upper drawing, the middle drawing and the lower drawing are viewed from the directions of [100], [110] and [111] respectively.

(FIG. 3)
FIG. 3 is a photograph substituting for a drawing showing the result of an example of the self-organized nanoparticulate silica of the present invention observed through a scanning electron microscope (SEM). The scale at the right bottom of the photograph shows a length of 20 nm by one scale and a length of 200 nm by the whole scale.

(FIG. 4)
FIG. 4 shows the result of X-ray diffraction (XRD) of an example of the self-organized nanoparticulate silica of the present invention. The axis of ordinate shows intensity (a.u.) and the axis of abscissa shows 2θ/degree in FIG. 4.

(FIG. 5)
FIG. 5 shows the measured result of nitrogen adsorption/desorption (isotherm) curve of an example of the self-organized nanoparticulate silica of the present invention. The axis of ordinate shows adsorbed or desorbed volume ($cm^3/g$) and the axis of abscissa shows relative pressure in FIG. 5. Black spheres (●) show adsorption, whereas white spheres (○) show desorption. The upper graph in FIG. 5 shows thus obtained pore size.

(FIG. 6)
FIG. 6 shows the result of X-ray diffraction (XRD) of an example of the calcined and as-synthesized self-organized nanoparticulate silica of the present invention. The upper curve is for calcined, and the lower curve is for as-synthesized in FIG. 6. The axis of ordinate shows intensity (a.u.) and the axis of abscissa shows 2θ/degree in FIG. 6.

(FIG. 7)
FIG. 7 shows the result of $^{29}$Si-MAS-NMR of an example of the calcined and as-synthesized self-organized nanoparticulate silica of the present invention. The upper curve is for calcined, and the lower curve is for as-synthesized in FIG. 7. The axis of ordinate shows signal intensity and the axis of abscissa shows chemical shift (δ) in FIG. 7.

(FIG. 8)
FIG. 8 shows the measured result of nitrogen adsorption/desorption (isotherm) curve of an example of the calcined self-organized nanoparticulate silica of the present invention. The axis of ordinate shows adsorbed or desorbed volume ($cm^3/g$) and the axis of abscissa shows relative pressure in FIG. 8. Black spheres (●) show adsorption, whereas white spheres (○) show desorption. The upper graph in FIG. 8 shows thus obtained pore size.

(FIG. 9)
FIG. 9 shows the measured result of nitrogen adsorption/desorption (isotherm) curve of an example of the as-synthesized self-organized nanoparticulate silica of the present invention. The axis of ordinate shows adsorbed or desorbed volume ($cm^3/g$) and the axis of abscissa shows relative pressure in FIG. 9. Black spheres (●) show adsorption, whereas white spheres (○) show desorption. The upper graph in FIG. 9 shows thus obtained pore size.

(FIG. 10)
FIG. 10 shows each result of X-ray diffraction (XRD) of the self-organized nanoparticulate silica of the present invention when the amount of L-lysine to be used in Example 2 was changed in the range of from 0.02 mol to 0.5 mol. The axis of ordinate shows intensity (a.u.) and the axis of abscissa shows 2θ/degree in FIG. 10.

(FIG. 11)
FIG. 11 is a transmission electron microscope photograph (TEM) showing that the fine silica particles of the present invention having a particle diameter of 4 to 30 nm produced in Example 1 are dispersed. The scale at the left bottom shows a length of 20 nm.

(FIG. 12)
Similarly to FIG. 11, FIG. 12 is a TEM photograph of the fine silica particles produced in Example 1.

(FIG. 13)
FIG. 13 shows each result of X-ray diffraction (XRD) of the self-organized nanoparticulate silica of the present invention when the concentration of octanol in the mixture in Example 2 was changed in the range of from 5% by mass to 40% by mass. The axis of ordinate shows intensity (a.u.) and the axis of abscissa shows 2θ/degree in FIG. 13.

(FIG. 14)
FIG. 14 is a photograph substituting for a drawing showing the result observed through a transmission electron microscope (TEM) when the mixture was added with octanol so as to be 5% by mass in Example 2. The white bar on the left shows a length of 50 nm.

(FIG. 15)
FIG. 15 is a photograph substituting for a drawing showing the result observed through a scanning electron microscope (SEM) when the mixture was added with octanol so as to be 5% by mass in Example 2. The scale at the right bottom of the photograph shows a length of 20 nm by one scale and a length of 200 nm by the whole scale.

(FIG. 16)
FIG. 16 shows each result of X-ray diffraction (XRD) of the self-organized nanoparticulate silica of the present invention when the mixture was added with ethanol, n-butanol, n-hexanol, n-octanol, n-decanol or n-dodecanol each so as to be 5% by mass in Example 2. The axis of ordinate shows intensity (a.u.) and the axis of abscissa shows 2θ/degree in FIG. 16.

(FIG. 17)
FIG. 17 shows the result of X-ray diffraction (XRD) of the self-organized nanoparticulate silica of the present invention when the mixture was added with 1.3 molar equivalents of n-octane in Example 2. The axis of ordinate shows intensity (a.u.) and the axis of abscissa shows 2θ/degree in FIG. 17.

(FIG. 18)
FIG. 18 shows the measured result of nitrogen adsorption/desorption (isotherm) curve of the self-organized nanoparticulate silica of the present invention when the mixture was added with 1.3 molar equivalents of n-octane in Example 2.

The axis of ordinate shows adsorbed or desorbed volume (cm³/g) and the axis of abscissa shows relative pressure in FIG. 18. Black spheres (●) show adsorption, whereas white spheres (○) show desorption. The upper graph in FIG. 18 shows thus obtained pore size.

(FIG. 19)

FIG. 19 is a photograph substituting for a drawing showing the result of the self-organized nanoparticulate silica of the present invention observed through a transmission electron microscope (TEM) when the mixture was added with 1.3 molar equivalents of n-octane in Example 2. The white bar on the left shows a length of 50 nm.

(FIG. 20)

FIG. 20 is a photograph substituting for a drawing showing the result of the self-organized nanoparticulate silica of the present invention observed through a scanning electron microscope (SEM) when the mixture was added with 1.3 molar equivalents of n-octane in Example 2. The scale at the right bottom of the photograph shows a length of 20 nm by one scale and a length of 200 nm by the whole scale.

(FIG. 21)

FIG. 21 shows the result of X-ray diffraction (XRD) of the self-organized nanoparticulate silica of the present invention when the mixture was added with 1.2 molar equivalents of 1,3,5-trimethylbenzene in Example 2. The axis of ordinate shows intensity (a.u.) and the axis of abscissa shows 2θ/degree in FIG. 21.

(FIG. 22)

FIG. 22 shows the measured result of nitrogen adsorption/desorption (isotherm) curve of the self-organized nanoparticulate silica of the present invention when the mixture was added with 1.2 molar equivalents of 1,3,5-trimethylbenzene in Example 2. The axis of ordinate shows adsorbed or desorbed volume (cm³/g) and the axis of abscissa shows relative pressure in FIG. 22. Black spheres (●) show adsorption, whereas white spheres (○) show desorption. The upper graph in FIG. 22 shows thus obtained pore size.

(FIG. 23)

FIG. 23 is a photograph substituting for a drawing showing the result of the self-organized nanoparticulate silica of the present invention observed through a transmission electron microscope (TEM) when the mixture was added with 1.2 molar equivalents of 1,3,5-trimethylbenzene in Example 2. The white bar on the left shows a length of 50 nm.

(FIG. 24)

FIG. 24 is a photograph substituting for a drawing showing the result of the self-organized nanoparticulate silica of the present invention observed through a scanning electron microscope (SEM) when the mixture was added with 1.2 molar equivalents of 1,3,5-trimethylbenzene in Example 2. The scale at the right bottom of the photograph shows a length of 20 nm by one scale and a length of 200 nm by the whole scale.

(FIG. 25)

FIG. 25 shows the result of X-ray diffraction (XRD) of a nanoparticulate silica as a comparative example when aqua ammonia was used instead of the aqueous solution of L-lysine in Example 2. The axis of ordinate shows intensity (a.u.) and the axis of abscissa shows 2θ/degree in FIG. 25.

(FIG. 26)

FIG. 26 shows the measured results of nitrogen adsorption/desorption (isotherm) curve of a nanoparticulate silica as a comparative example when aqua ammonia was used instead of the aqueous solution of L-lysine in Example 2. The axis of ordinate shows adsorbed or desorbed volume (cm³/g) and the axis of abscissa shows relative pressure in FIG. 26. Black spheres (●) show adsorption, whereas white spheres (○) show desorption. The upper graph in FIG. 26 shows thus obtained pore size.

(FIG. 27)

FIG. 27 is a photograph substituting for a drawing showing the result of a nanoparticulate silica as a comparative example observed through a transmission electron microscope (TEM) when aqua ammonia was used instead of the aqueous solution of L-lysine in Example 2. The white bar on the left shows a length of 50 nm.

(FIG. 28)

FIG. 28 is a photograph substituting for a drawing showing the result of a nanoparticulate silica as a comparative example observed through a scanning electron microscope (SEM) when aqua ammonia was used instead of the aqueous solution of L-lysine in Example 2. The scale at the bottom of the photograph shows a length of 10 nm by one scale and a length of 100 nm by the whole scale.

The present invention will be described hereinafter more specifically with reference to the examples, to which, however, the present invention is not limited at all.

EXAMPLE 1

2.92 mg (0.02 mmol) of L-lysine were dissolved in 2.92 g of deionized water at 60° C. to prepare a 0.1% by mass aqueous solution of L-lysine. This solution was added with 20.33 mg (1 mmol) of tetraethoxysilane (TEOS), stirred at 60° C. for 15 hours and then left for standing at 100° C. for 15 hours. The silica compound was deposited to produce fine silica particles. The result of the obtained fine silica particles observed through a transmission electron microscope (TEM) is shown in FIG. 11 and FIG. 12 The bar at the left bottom of FIG. 11 and FIG. 12 shows a scale of a length of 20 nm. It can be seen in these figures that fine particles of a uniform diameter of about 7 to 10 nm are dispersed.

The fine silica particles were then dried at 100° C. to a solid. The obtained white solid was recovered and then calcined at 500° C. to obtain 50 mg of a product (yield: 75%).

The result of the obtained product observed through a transmission electron microscope (TEM), the result observed through a scanning electron microscope (SEM) and the result of X-ray diffraction (XRD) are shown in FIG. 1, FIG. 3 and FIG. 4 respectively. The measured result of nitrogen adsorption/desorption (isotherm) curve of the product is shown in FIG. 5.

EXAMPLE 2

2.92 mg (0.02 mmol) of L-lysine were dissolved in 2.92 g of deionized water at 60° C. to prepare a 0.1% by mass aqueous solution of L-lysine. This solution was added with 208.33 mg (1 mmol) of tetraethoxysilane (TEOS), stirred at 60° C. for 15 hours. The solution was then dried to a solid. The obtained white solid was recovered and then calcined at 500° C. to obtain 50 mg of a product (yield: 75%).

Similar operations were carried out with the amounts of 0.05 mmol, 0.10 mmol, 0.20 mmol or 0.50 mmol of L-lysine.

The results of X-ray diffraction (XRD) of each obtained product are shown in FIG. 10.

The results show that this range of the amounts of L-lysine has no particular effect on the lattice structure of the product.

EXAMPLE 3

Similar operations were carried out as in Example 2 except that octanol was added to the aqueous solution of L-lysine (0.02 mmol) in Example 2 so as to be 5% by mass, 10% by mass, 20% by mass, 30% by mass or 40% by mass. In the case that octanol was added so as to be 5% by mass, the molar ratio of the octanol to TEOS was 1.1.

The results of X-ray diffraction (XRD) of each obtained product are shown in FIG. 13.

The results show that this range of the amounts of added octanol has no particular effect on the lattice structure of the product.

The results of X-ray diffraction (XRD) and $^{29}$Si-MAS-NMR for both calcined and as-synthesized when octanol was added so as to be 5% by mass are shown in FIG. 6 and FIG. 7 respectively. The measured result of the nitrogen adsorption/desorption (isotherm) curve for calcined is shown in FIG. 8 whereas the measured result of the nitrogen adsorption/desorption (isotherm) curve for as-synthesized is shown in FIG. 9.

Further, the results observed through a transmission electron microscope (TEM) and a scanning electron microscope (SEM) when octanol was added so as to be 5% by mass are shown in FIG. 14 and FIG. 15 respectively which are photographs substituting for drawings.

EXAMPLE 4

Similar operations were carried out as in Example 2 except that the aqueous solution of L-lysine (0.02 mmol) in Example 2 was added with ethanol, n-butanol, n-hexanol, n-octanol, n-decanol or n-dodecanol each so as to be 5% by mass.

The results of X-ray diffraction (XRD) of each obtained product are shown in FIG. 16.

The results show that addition of ethanol presumably has an unfavorable effect on the lattice structure of the product, whereas addition of alcohol of 4 or more carbon atoms has no particular effect and addition of alcohol of 8-10 carbon atoms improves the regularity of the lattice structure.

EXAMPLE 5

Similar operations were carried out as in Example 2 except that 1.3 molar equivalents of n-octane per 1 mol of TEOS were added to the aqueous solution of L-lysine (0.02 mmol) in Example 2.

The result of X-ray diffraction (XRD) and the measured result of the nitrogen adsorption/desorption (isotherm) curve of each obtained product are shown in FIG. 17 and FIG. 18 respectively. The results observed through a transmission electron microscope (TEM) and a scanning electron microscope (SEM) are shown in FIG. 19 and FIG. 20 respectively which are photographs substituting for drawings.

The results show that addition of octane improves the regularity of the lattice structure.

EXAMPLE 6

Similar operations were carried out as in Example 2 except that 1.2 molar equivalents of 1,3,5-trimethylbenzene (TMB) per 1 mol of TEOS were added to the aqueous solution of L-lysine (0.02 mmol) in Example 2.

The result of X-ray diffraction (XRD) and the measured result of the nitrogen adsorption/desorption (isotherm) curve of each obtained product are shown in FIG. 21 and FIG. 22 respectively. The results observed through a transmission electron microscope (TEM) and a scanning electron microscope (SEM) are shown in FIG. 23 and FIG. 24 respectively which are photographs substituting for drawings.

The results show that addition of TMB improves the regularity of the lattice structure.

COMPARATIVE EXAMPLE 1

Similar operations were carried out as in Example 2 except that aqua ammonia of 0.1 molar equivalents in terms of ammonia per 1 mol of TEOS were used instead of the aqueous solution of L-lysine (0.02 mmol) in Example 2.

The result of X-ray diffraction (XRD) and the measured result of the nitrogen adsorption/desorption (isotherm) curve of each obtained product are shown in FIG. 25 and FIG. 26 respectively. The results observed through a transmission electron microscope (TEM) and a scanning electron microscope (SEM) are shown in FIG. 27 and FIG. 28 respectively which are photographs substituting for drawings.

Regularity in the arrangement of particles was not confirmed, while formation of uniform nanoparticulates of a particle diameter of about 10 nm was seen in the TEM image of the obtained silica.

These results are summarized in the following Table 1. In Table 1, No. 1 is for Example 2 where an aqueous solution of L-lysine (0.02 mmol) was used, No. 2 is for Example 5 where octane was added, No. 3 is for Example 3 where octanol was added so as to be 5% by mass, No. 4 is for Example 6 where TMB was added, and No. 5 is for Comparative Example 1 where aqua ammonia was used instead of the aqueous solution of lysine.

TABLE 1

| No. | | d value$^a$/nm first | d value$^a$/nm second | d value$^a$/nm third | Particle size$^b$/nm | $A_{BET}{}^c$/ m$^2$ g$^{-1}$ | Pore size$^d$ (desorption)/ nm |
|---|---|---|---|---|---|---|---|
| 1 | Lys | 10.8 | 7.5 | 5.0 | 8.3 ~ 9.5 | 269 | 3.6 |
| 2 | Lys-C$_8$H$_{18}$ | 13.1 | 8.3 | 5.9 | 6.7.~ 13.3 | 228 | 3.6 |
| 3 | Lys-C$_8$H$_{17}$OH | 11.8 | 7.7 | 5.3 | 6.7 ~ 7.3 | 227 | 3.5 |
| 4 | Lys-TMB | 12.8 | 8.2 | 5.5 | 6.7 ~ 8.3 | 212 | 3.5 |
| 5 | NH$_3$ aq. | 11.9 | — | — | — | 364 | 4.9 |

$^a$calculated from the peak position in the XRD pattern,
$^b$estimated by TEM image,
$^c$A$_{BET}$: BET specific surface area,
$^d$the average pore size was calculated by the D-H method from the desorption branch.

In Table 1, the d-value was calculated based on the XRD pattern, the particle size was calculated from the result of TEM, and the pore size was calculated by the D-H method from the nitrogen adsorption/desorption curve.

EXAMPLE 7

3.48 mg (0.02 mmol) of L-arginine was dissolved in 3.48g of deionized water at 60° C. to prepare a 0.1% by mass aqueous solution of L-arginine. This solution was added with 208.33 mg (1 mmol) of tetraethoxysilane (TEOS), stirred at 60° C. for 15 hours and then left for standing at 100° C. for 15 hours. The solution was then dried to a solid. The obtained white solid was recovered and then calcined at 500° C. to obtain 52 mg of a product (yield: 81%).

Industrial Applicability

The present invention provides a novel silica material of a structure of a primitive cubic lattice having mesopores formed by regularly arranged ultrafine silica particles. The silica material is used for microelectronics materials and nanocarbon materials besides for catalysts and adsorbents, and thus has industrial applicability.

Further, the silica material of the present invention can be produced by a simple means without using a special template and thus is suitable for industrial production and has industrial applicability.

The invention claimed is:

1. A process for producing a self-organized nanoparticulate silica characterized in that the average particle diameter thereof is 4 to 30 nm, and wherein the particles are regularly arranged so as to form a primitive cubic lattice, specific surface area measured by nitrogen absorption/desorption is 200 to 350 m$^2$/g, and average pore size is 3 to 5 nm, the process comprising reacting a mixture consisting of an alkoxysilane, an aqueous solution of a basic amino acid and optionally organic auxiliaries as needed at 40 to 100° C. and then subjecting the reaction mixture to drying.

2. The process according to claim 1, wherein the average particle diameter is 6 to 20 nm.

3. The process according to claim 1 or 2, comprising further calcination of the dried mixture after drying.

4. The process according to claim 3, wherein the calcination is carried out at 450 to 700° C. in the air.

5. The process according to claim 1, wherein the organic auxiliaries are a hydrocarbon or an alcohol.

* * * * *